(12) United States Patent
DiPaola et al.

(10) Patent No.: US 12,189,458 B2
(45) Date of Patent: Jan. 7, 2025

(54) LOW-POWER COMPOSTING MONITOR

(71) Applicant: Compai, LLC, Cincinnati, OH (US)

(72) Inventors: Angelina Frances DiPaola, Cincinnati, OH (US); Michael Joseph DiPaola, Cincinnati, OH (US)

(73) Assignee: Compai, LLC, Cincinnati, OH (US)

( * ) Notice: Subject to any disclaimer, the term of this patent is extended or adjusted under 35 U.S.C. 154(b) by 0 days.

(21) Appl. No.: 17/980,859

(22) Filed: Nov. 4, 2022

(65) Prior Publication Data
US 2024/0077931 A1 Mar. 7, 2024

Related U.S. Application Data

(60) Provisional application No. 63/292,385, filed on Dec. 21, 2021.

(51) Int. Cl.
  *G06F 1/32* (2019.01)
  *G06F 1/3212* (2019.01)
  *G06F 1/3296* (2019.01)

(52) U.S. Cl.
  CPC .......... *G06F 1/3296* (2013.01); *G06F 1/3212* (2013.01)

(58) Field of Classification Search
  CPC .............................. G06F 1/3296; G06F 1/3212
  See application file for complete search history.

(56) References Cited

U.S. PATENT DOCUMENTS

2010/0089122 A1* 4/2010 Abdullah ............. G01N 27/122
    73/25.05

FOREIGN PATENT DOCUMENTS

WO    WO-2021081597 A1 *  5/2021  ............ C05F 17/993

OTHER PUBLICATIONS

SmarTprobe Wireless Temperature Probes, "Robust and reliable temperature monitoring for the waste and recycling industries," https://www.wirelesstemperatureprobes.com/, Accessed Jun. 29, 2024, 3 pages.
Team Boomer Soon: Darian Johnson, Mike Bradfor, "Smart Compost System," https://www.hackster.io/team-boomer-sooner/smart-compost-system-0037d7, Accessed Jun. 29, 2024, 6 pages.
"13-year-old designs electronic monitoring system for compost bins," Recycling Magazine, https://www.recycling-magazine.com/2019/05/20/13-year-old-designs-electronic-monitoring-system-for-compost-bins/, Accessed Jun. 29, 2024, 1 page.

* cited by examiner

*Primary Examiner* — Stefan Stoynov
(74) *Attorney, Agent, or Firm* — Dinsmore & Shohl LLP

(57) ABSTRACT

The invention is a monitoring device for use in composting comprising a system controller, a wireless communication controller, at least one sensor, a rechargeable power cell and a recharging means, with a power consumption rate of less than 0.50 W-hrs/day. The invention includes a method of using the compost monitoring device in conjunction with a receiving device that includes suitable algorithms to interpret the sensor data to provide a user with recommended actions for maintaining the compost.

13 Claims, 9 Drawing Sheets

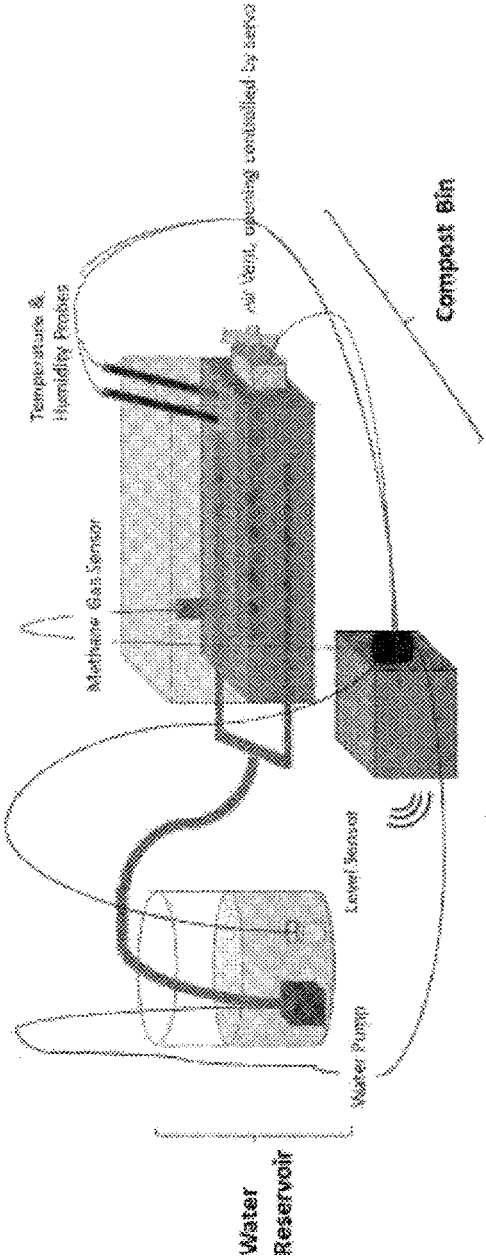
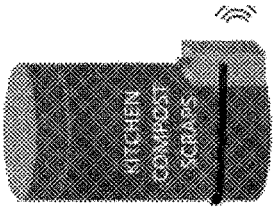
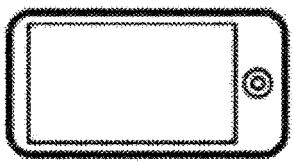
Figure 9
PRIOR ART

LOW-POWER COMPOSTING MONITOR

BACKGROUND

Composting of organic waste materials is becoming increasingly popular, both at an industrial/commercial scale and for home practitioners. It can be an effective and environmentally responsible means to dispose of organic wastes, and the resulting finished compost material is a valuable natural fertilizer and soil amendment.

Successful composting requires attention to conditions such as temperature, moisture level, and aeration/oxygen availability of the composting media. It also requires physical attention including mixing/aeration of the decomposing materials, adding water, and adding new waste materials to the bin or pile.

A poorly managed compost system can have a range of different problems. The most serious of these is anerobic decomposition, which is caused by overly wet conditions without sufficient oxygen/aeration, and results in slimy and foul-smelling compost. Further, an anaerobic compost system produces methane and other potent greenhouse gasses, negating many of the potential environmental benefits of the composting process.

Compost monitoring systems and composting devices incorporating monitoring systems are known. These monitoring systems generally include at least an electronics controller, a power source, and a series of sensors each directed at detecting one or more conditions of the compost. For example, internet reference as available on the public internet as of Oct. 30, 2022: https://create.arduino.cc/projecthub/teams/team-boomer-sooner, with an initial posting date of Jun. 24, 2017, describes an electronics schematic of a compost monitoring system. The disclosed system includes the known, generic, componentry for a functioning monitor.

Large-scale composting, such as industrial-level composting, is supported by a number of monitoring systems that are known in both the literature and as commercially available products. These products, however, are not designed for home use in that their power-consumption needs are generally higher and are often intended for use as part of a system with each component performing a single task, rather than as a stand-alone device which includes all the functionality required to monitor composting conditions and communicate those conditions.

For example, temperature monitoring systems are available for inground composting from Smart Probe as of Oct. 30, 2022. (https://www.wirelesstemperatureprobes.com/). These systems/sensors are for designed for industrial use and are limited to measuring soil temperature. The power source appears to be batteries that need to be serviced or replaced on some frequency. They also appear to be expensive, making them impractical for a homeowner that is interested in composting at home. They do provide for remote monitoring and can provide data from the sensors via cellular data network.

From the patent literature, patent reference CN106718790 describes a monitoring system for irrigation systems that incorporates electronics and sensors and a power source such as a rechargeable lithium-ion battery. However, the system is over-designed for home use and does not provide a means to conveniently recharge the battery nor is the system configured to control its power consumption in accordance with the recharging means.

The non-patent literature further includes a reference found in Recycling Magazine's May 20, 2019 issue which reports on a design for an electronics-based system for monitoring composting materials. The published system, again, includes the generic elements of a monitor (e.g. electronics controller, power source, sensors) but again is overdesigned for convenient home-use and again does not provide a means to conveniently recharge the battery nor is the system configured to control its power consumption in accordance with the recharging means.

Further, many composting apparatuses have been imagined that incorporate compost monitoring systems. These systems range from outdoor bins to indoor appliances. None of these systems satisfies the need for a compost monitoring device that is appropriate for home use given the large variety of container-types used by people who compost at home. Compost monitoring systems which are designed to be integrated into composting apparatuses are again, generally overdesigned or designed for use with that specific apparatus rather than generically for use across a variety of composting containers (including a no-container pile or mound).

For example, patent reference US2015/0040626A1 describes an indoor composting appliance. The reference further describes numerous sensors, actuators, and heating elements. Being an indoor appliance, the power source is line voltage, so there do not appear to be any limitation on the number of features described and no power-management requirements are discussed.

Patent reference WO2019/018902 describes an in-ground composting bin with an integrated compost monitoring device. Again, the compost monitoring device includes the generic elements of an electronics controller, a power source, and any of a number of sensors. The monitoring device further includes a memory and a means to communicate the output from the sensor(s); for example, to a remote database or like facility. The communication system is further described as potentially including Bluetooth or a mobile phone network. As above, the described composting bin does not meet the needs of the variety of home-composters in that the monitor is designed for the particular bin only and has not been designed for flexible use across a variety of containers and conditions.

Many people who compost at home do not want to invest in such complex and expensive devices or systems described in the existing patent art or in the public domain literature. While composting is, ultimately, a natural process and will eventually occur even without monitoring, this may result in less-than optimal compost. Many home-composters prefer to adjust the compost conditions and actively manage the composting material. For example, through mixing or adding of water or other materials.

Other people may choose to not compost at home because they believe that it is a complex process and they lack the knowledge for how to start and how to maintain the compost over time. Still other people have attempted composting at home previously but encountered problems such as objectional odors, and then stopped composting. The available complex and expensive systems reinforce this perspective that composting is a complex and/or expensive process, and thus limit the popular adoption of home composting.

The composting apparatuses discussed above may simplify the process, in part by automating it, but such automation consumes a meaningful amount of electricity, which can be provided by line-voltage, but most people place their compost bin away from their house where access to line-voltage is inconvenient.

People who compost at home also use a variety of composting containers, which may be a simple as empty drum or bucket, or even a pile with no-container at all. As such, a flexibly useful compost monitoring device would be one which is adaptable across a variety of container-types. Of course, the user, rather than an apparatus, must attend to the compost and perform any management tasks themselves (e.g. through mixing or adding of water or other materials). As such, it would be further useful if the compost monitoring device could communicate to the user a recommended action when such an action is indicated.

As such there exists a need for a small, inexpensive, reliable, low-power monitoring device for composting that can monitor multiple attributes to enable the user to maintain a healthy and productive compost. Further, there is a need for these devices to be able to report the data remotely to inform the user when there is a need to adjust the compost conditions and to indicate the nature of the modification required.

Further, there is a need to optimize the recommended conditions and improve the quality of the resulting compost within a given community by comparing compost conditions and quality within a region of similar climate and by allowing various users within such a community to understand and learn from one another's success in composting.

SUMMARY OF THE INVENTION

The invention includes a monitoring device for use in composting comprising a system controller and a communication controller (such as a wireless communication controller). The invention further includes at least one sensor operatively connected to the system controller and at least one rechargeable power cell operatively connected to the system controller and to the communications controller; the rechargeable power cell is further connected to a recharging means. The system controller, communication controller and power cell are contained within a casing. The monitoring device has a power consumption rate of less than 0.50 W-hrs/day The device may include two or more sensors. The system controller may sample data from the sensor(s) fewer than 25 times per day. The power consumption associated with sampling the sensors may be less than 0.20 W-hrs/day. The sensors may be one or more of a moisture sensor, humidity sensor, temperature sensor, pH sensor, methane sensor, carbon dioxide sensor, or oxygen sensor.

The communication controller may be a wireless communication controller and may use Wi-Fi, Bluetooth, and/or cellular (e.g. 2G, 3G, 4G, LTE, or 5G) radio communication. The communication controller may operate in a series of sleep and wake cycles. The communication controller may wake fewer than 25 times per day.

The rechargeable power cell may be a rechargeable battery. The rechargeable battery may be a Li-ion battery, a Ni-MH battery, a Ni—Cd battery, or a lead-acid battery. The rechargeable battery may have a maximum usable power capacity of 18.5 W-hrs.

The system controller may also have the ability to measure and report the state-of-charge of the rechargeable power cell. It may measure the state-of-charge of the rechargeable power cell fewer than 25 times per day but to manage power consumption this sampling may be reduced to 10×/day or even 5×/day or only 2×/day. The power consumption associated with measuring the power cell state-of-charge may be less than 0.10 W-hrs/day.

The recharging means may be a photovoltaic solar panel. The solar panel may have a maximum ideal rated output of 2.0 Watts. The solar panel may be small with a surface area of less than about 20 square-inches.

The casing may be small with a total volume less than 20 cubic-inches. The casing may have a generally parallelepiped shape and the solar panel may be adjacent to a major face of the casing. The casing and necessary penetrations may be suitably gasketed to make it weatherproof and reduce the potential for intrusion of water, dirt, or other contaminants into the casing.

The total interior volume of the casing may be minimized to reduce headspace within the casing that surrounds the system controller, power cell, and other interior componentry. The headspace within the casing may be less than 30% of the volume of the casing.

The invention further includes a method of using the monitoring device comprising associating the device with a container, providing compostable material into the container, sealing the container, associating the one or more sensors with one of the compostable material or the headspace above the compostable material, and monitoring the data from the sensors.

The method may also include transmitting the data from the sensors via the system controller and/or communications controller to a receiving device. The receiving device may further comprise a means for data storage and analysis (such as a smart-phone or computer or internet web site or cloud server). The receiving device may analyze the data from the monitor and provide a recommended action to the user based on the data.

The method may also include providing external data to the receiving device from an external database and incorporating the external data into the recommended action. The external data may include past, present or forecasted climatic information.

The method may also include providing external data to the receiving device from an external database and incorporating the external data into the recommended action where the external data includes sensor-data from other monitoring device users in the same geographic area as the user.

BRIEF DESCRIPTION OF DRAWINGS

FIG. 9 depicts a schematic of comparative example 1 from internet reference https://create.arduino.cc/projecthub/teams/team-boomer-sooner

DETAILED DESCRIPTION

Figure 1:
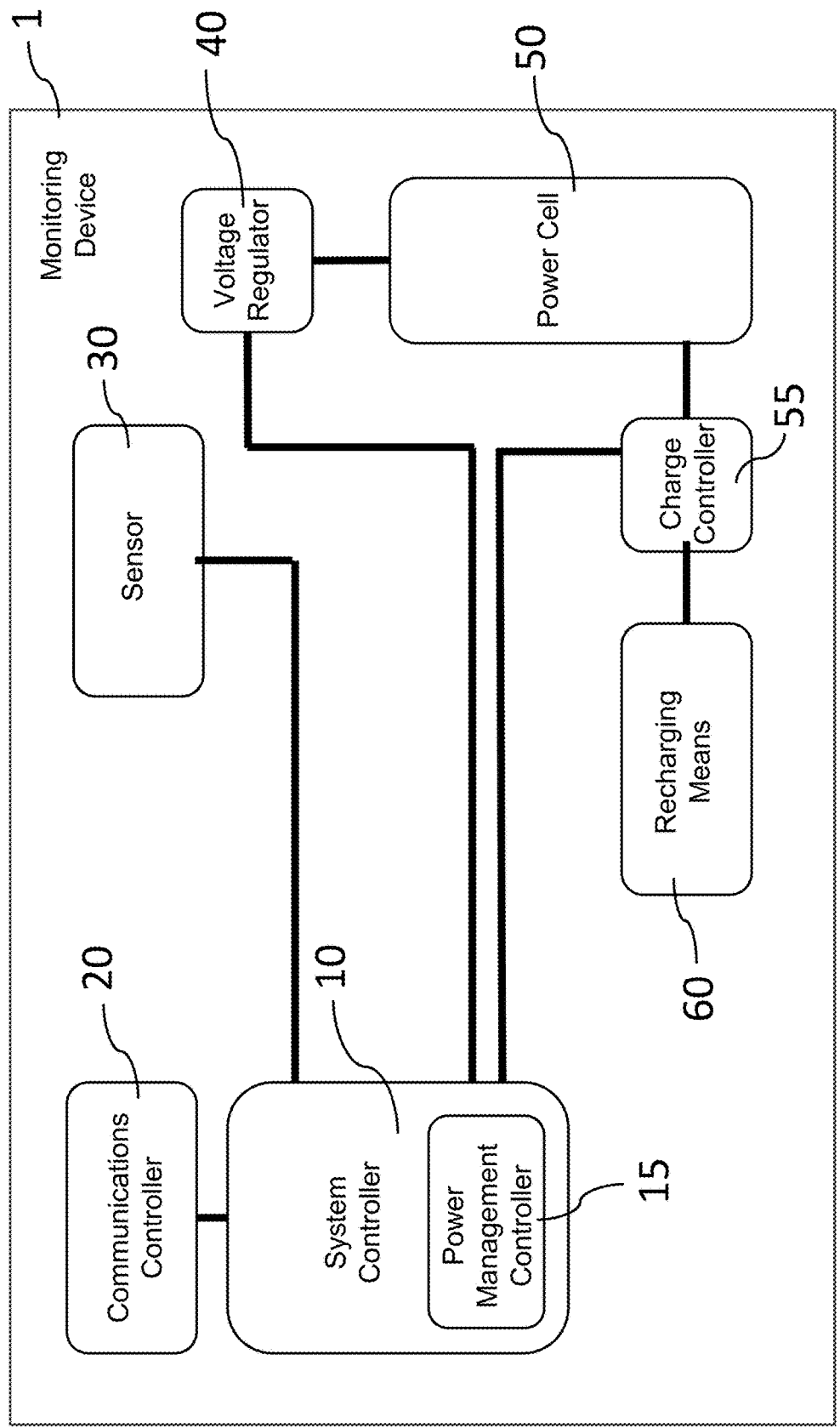
FIG. 1 depicts a block diagram of the monitoring device
Figure 2:
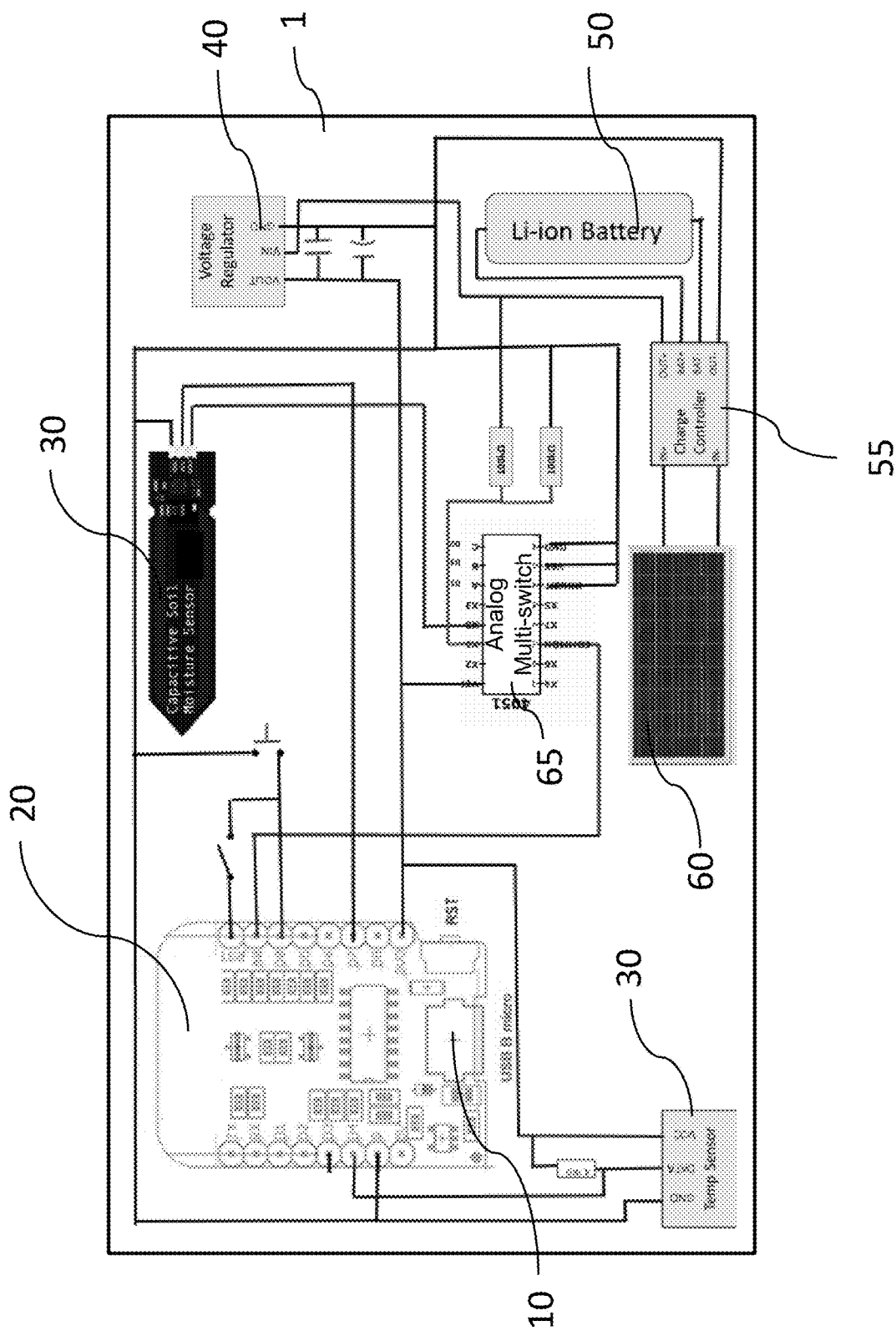
FIG. 2 depicts an electronics schematic of an exemplary embodiment of the monitoring device

Referring to FIGS. 1-2, the invention includes a monitoring device 1 for use in composting comprising a system controller 10, a communications controller 20 (such as a wireless communication controller), sensor(s) 30 and a power cell 50. Importantly, the monitoring device 1 is a low-power device that can operate continuously in an outdoor environment without being connected to an external source of power such as line-voltage. Many of the specific configurations of the device have been selected or designed to accommodate the need for low-power operation.

The system controller is central to the monitoring device and is operatively connected to each of the sensors, the power cell and the communications controller. The system controller is powered by the power cell, samples data from the sensor(s), and optionally also from the power cell or other circuit componentry, and communicates this data to the user via the communications controller. The system controller may be a separate component from any of the sensor(s), power cell, or communication controller or may be integral with any of the aforementioned components. A preferred configuration is one in which the system controller and the communication controller are integrated into a single component.

The system controller includes a data-sampler that is programmable both in terms of the number and types of sensors to be controlled/sampled and the frequency with which the system controller samples data from the sensor(s). A preferred mode of operation is one in which the frequency of data sampling from the sensor(s) is no more than 12 times per day, or no more than 8 times per day, or 4 times per day or even 2 times per day as a means to achieve low power consumption.

The system controller 10 may include a power management controller 15 that is programmable to place the monitor in a low-power or "sleep" mode versus an operating or "waking" mode. A preferred mode of operation is one in which the power management controller 15 places the monitor in sleep mode the majority of the time, only waking the monitor when data-sampling and/or communication is required. Since data sampling and communication takes only seconds, the monitor may be maintained in sleep mode for the majority of a day. For example, the monitor may be in sleep mode more than 90% of a day or more than 95% of a day or even more than 99% of a day as a means to achieve low power consumption. A preferred mode of operation is one in which the controller enters a low-power mode between episodes of data sampling and/or communication.

The monitoring device includes a communication controller that allows the data sampled from the sensors by the system controller to be communicated to a user. The communication controller preferably uses wireless communication.

As with the system controller, a preferred mode of operation for the communication controller includes a low-frequency of communication. The communication controller may operate in a series of sleep and wake cycles. The communication controller may wake fewer than 25 times per day, or no more than 12 times per day, or no more than 8 times per day, or 4 times per day or even 2 times per day as a means to achieve low power consumption.

As with the system controller, the communication controller may be maintained in sleep mode when not in use. The communication controller may be maintained in sleep mode more than 90% of a day or more than 95% of a day or even more than 99% of a day as a means to achieve low power consumption. A preferred mode of operation is one in which the communications controller enters a low-power mode between episodes of communication.

The communication controller may utilize wireless communication such as Wi-Fi or Bluetooth or cellular communication (e.g. 2G, 3G, 4G, LTE, 5G).

The communication controller communicates with a receiving device. The receiving device may be a modem that further communicates with the internet or may be some other electronic device, or an analog or digital read-out integral to or otherwise connected to and/or communicating with the monitoring device.

The communication controller may produce a digital or other legible and/or recordable output adjacent to the monitoring device, or the communications controller may include a wireless communications component such as a Wi-Fi functionality so that the output data from the sensors may be produced elsewhere. The inclusion of the wireless communications component may be preferred as it eliminates the requirement that the user check the readout on the monitor directly. The wireless communication functionality may also be preferred as it allows data from the monitor to be communicated directly to a receiving device such as the internet, computer or smartphone, where data storage and further analysis can be performed.

The invention further includes at least one sensor operatively connected to the system controller. The system controller samples signals from the sensors in the form of data that is then transmitted by the communication controller. While the system controller and the communication controller are common to many monitoring devices, the sensors are selected specifically for their utility in monitoring of composting material.

Any of a number of sensors are known to be helpful in monitoring and maintaining composting material including moisture sensors, humidity sensors, temperature sensors, pH sensors, methane sensors, carbon dioxide sensors, and oxygen sensors and combinations thereof. Sensors may be selected to sample data from the composting material directly or from the head space above the composting material in a container.

Sensors can be any number of designs or types that are powered by electricity, measure some physical parameter, and output that measurement value either via analog or digital signal. The preferred execution utilizes low-voltage sensors, typical requiring 3 to 5 volts or less. Further, the preferred execution utilizes sensors with a specified preheat time or initialization time of less than 10 minutes, or less than 1 minute, or less than 10 seconds.

The sensors may be selected so that the power consumption associated with data sampling of the sensors is less than 0.20 W-hrs/day, or less than 0.10 W-hrs/day, or less than 0.05 W-hrs/day.

The most preferred types of sensors for monitoring composting material include a temperature sensor and a substrate moisture sensor.

A preferred system controller is one that has both digital and analog input capability to accommodate a range of different sensor types.

Moisture sensors include sensors that are comprised of an inductive coil that measures capacitance or a pair of positive and negative electrodes that measure resistance. These sensors are designed to measure the % moisture content of a solid or semi-solid substrate, such as soil, sand, compost, or other planting medium, and generally require to be inserted or buried to a sufficient depth to achieve an accurate measurement. Sensors that do not require direct electrical contact with the substrate, such as capacitive sensors, are preferred in this application as they can be protected with a coating of plastic or other barrier materials while still maintaining accurate readings and are less likely corrode or otherwise fail.

Humidity sensors include sensors that are comprised of a capacitive sensor and a thermistor. These sensor modules are designed to measure the moisture content in air or another gas or mix or gasses. In this application these sensors can be used to measure the moisture content of the headspace air above or around the composting substrate. This is often expressed as a dewpoint, wet-bulb, or % relative humidity.

Temperature sensors include sensors that are comprised of a thermistor. These sensors are designed to measure temperature in air, liquid, solid, or semi-solid substrate. In this application, the temperature sensor can be used to measure the headspace air temperature or the temperature of the solid or semi-solid compost substrate.

pH sensors include sensors that are comprised of two electrodes and the ability to measure small differences in voltage across the two electrodes. These sensors are designed to measure the pH of a liquid, loose solid, or semi-solid. Electrical contact with the liquid, semi-solid, or solid substrate is required for a reading.

Methane sensors include sensors that are comprised of an electrode which is coated with a sensing material, typically a metal oxide (i.e. $SnO_2$), and is heated to make it more sensitive. These sensors are designed measure the concentration of methane in air or another mix of gasses. In this application these sensors are used to measure the methane content of the headspace air above or around the composting substrate. This is expressed as a parts per million content.

Carbon dioxide sensors include sensors that are comprised of an electrode which is coated with a sensing material, typically a metal oxide (i.e. $SnO_2$), and is heated to make it more sensitive. These sensors are designed measure the concentration of carbon dioxide gas in air or another mix of gasses. In this application these sensors are used to measure the carbon dioxide content of the headspace air. This is expressed as a parts per million content.

Oxygen sensors include sensors that are comprised of an electrode which is coated with a sensing material, typically a metal oxide (i.e. $TiO_2$), and is heated to make it more sensitive. These sensors are designed measure the concentration of oxygen gas in air or another mix of gasses. In this application these sensors are used to measure the oxygen content of the headspace air. This is expressed as a parts per million content.

The monitoring device requires electrical power. A key feature of the monitoring device is that it is designed for low power consumption, and as such does not require line-voltage, and can be used in remote locations (i.e. away from buildings) where line-voltage is not readily available or cost prohibitive.

The monitoring device may be powered by a power cell such as a battery. When a conventional battery is depleted it requires either replacement or recharging. While it is possible to use single-use disposable batteries as a power cell, these can be inconvenient to remove and replace, are wasteful, and when they are depleted will result in gaps during which the monitoring device does not function.

The power cell may preferably be rechargeable without being removed or replaced. The power cell may be a rechargeable electrochemical battery. The power cell may be a rechargeable electrochemical battery selected from the group of lead-acid, nickel-cadmium, nickel-metal-hydride, or lithium-ion batteries. The rechargeable battery may have a maximum usable power capacity of 18.5 W-hrs, or the rechargeable battery may have a maximum usable power capacity of 12.5 W-hrs, or the rechargeable battery may have a maximum usable power capacity of 8.5 W-hrs. In a preferred configuration the rechargeable battery is a single Lithium-ion cell in the industry standard 18650 format with a nominal voltage of 3.7 Volts and a real-world useable capability of 5 A-hrs while maintaining a minimum output voltage of 3.5 Volts.

Figure 3A:
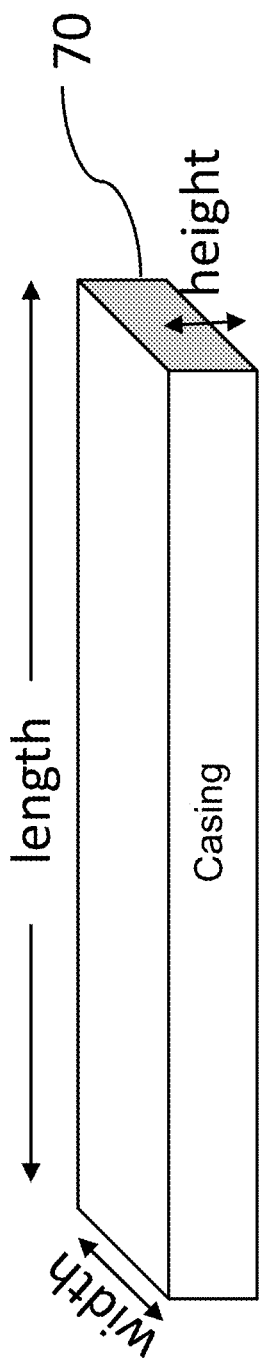
FIG. 3a depicts a casing for the monitoring device
Figure 3B:
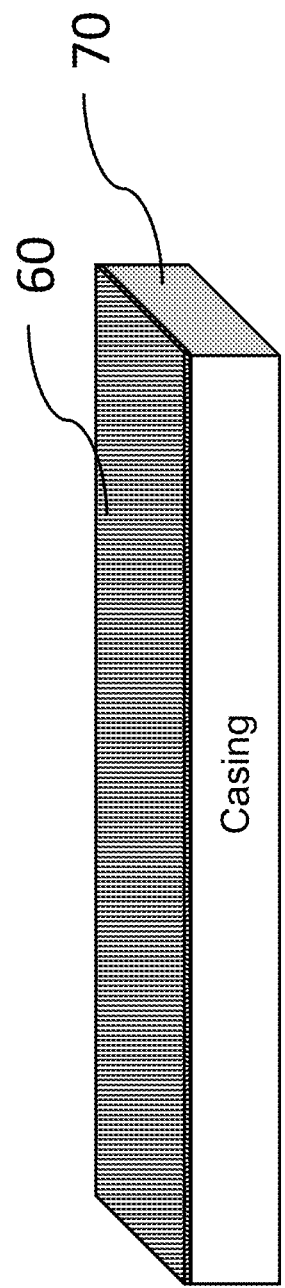
FIG. 3b depicts an exemplary embodiment of the casing adjacent to the recharging means where the recharging means is a photovoltaic solar panel

Referring to FIGS. 3a-3b, the power cell 50 is recharged by a recharging means 60. The recharging means 60 may include an electromechanical means such as a hand-crank or windmill or other mechanical energy resource. The power cell 50 may be recharged by a thermal means such as a thermoelectric generator. Preferably, the power cell 50 may be recharged by light energy, for example by using one or more photovoltaic solar panels as the recharging means 60. The power cell 50 may be recharged after it has been depleted, or preferably, may be recharged continuously as long as an energy resource is available (e.g. during sunlight hours for the solar panels or during wind for the windmill) and sufficient voltage can be supplied for recharging.

Figure 4A:
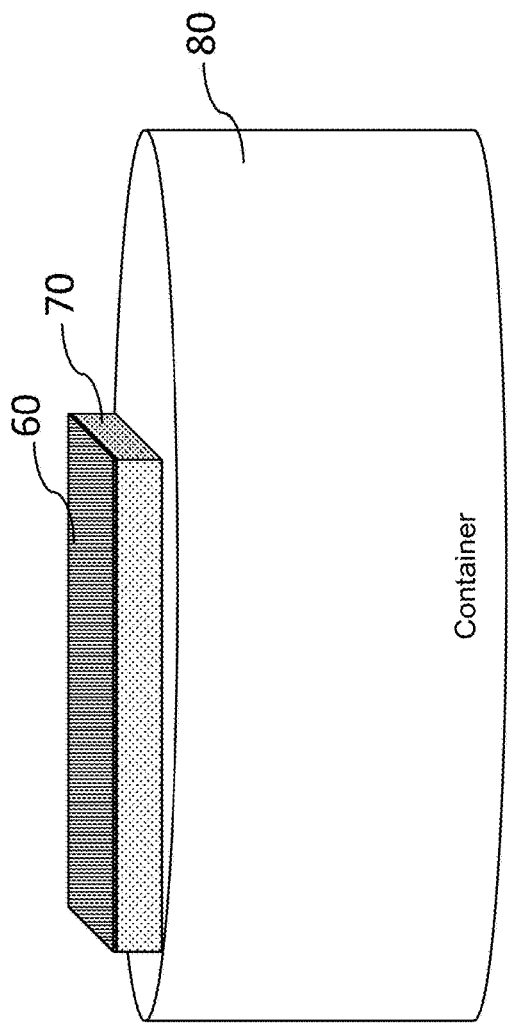
FIG. 4a depicts the monitoring device adjacent to a container for composting
Figure 4B:
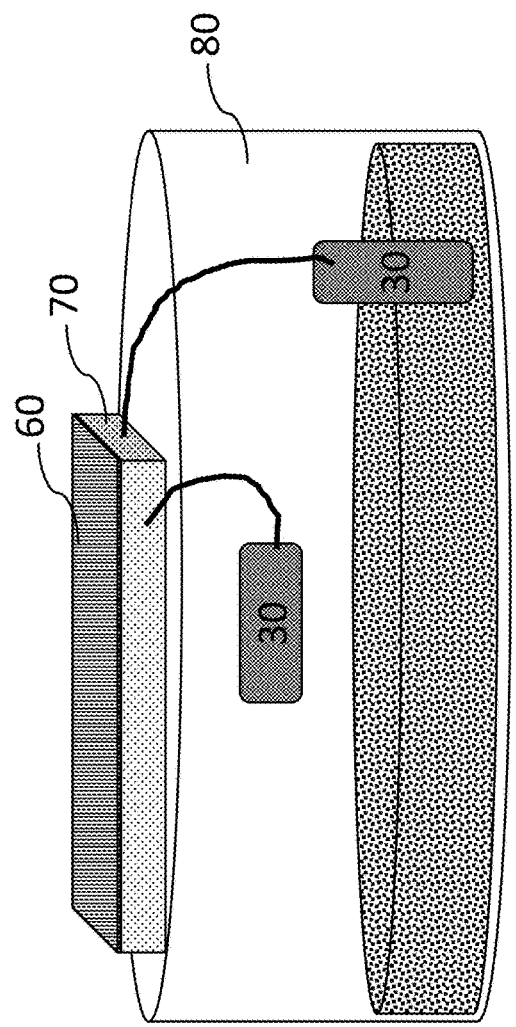
FIG. 4b depicts an exemplary embodiment of the monitoring device adjacent to a container with two sensors, one of which is associated with a composting material in the container and the other of which is associated with the headspace above the composting material in the container.

Referring to FIGS. 4a-4b, the recharging means 60 is preferably a photovoltaic solar panel. As the monitoring device 1 includes a casing 70 that is preferably small (see below) and the solar panel is preferably adjacent to the casing 70 (FIG. 3b) the solar panel is preferably small. The solar panel may have a surface area of less than about 20 square inches or less than about 15 square inches. The solar panel may be a 3-inch by 5-inch solar panel. This panel size enables a monitor size and casing 70 size small enough be easily located and secured to a composting container 80, including composting containers 80 of smaller sizes (e.g. less than about 10 gallons volume). Such a small solar panel is, then, limited in the power it can provide in recharging the power cell 50. The solar panel may have a rated instantaneous output of 2.0 W, as measured under ideal laboratory conditions at 1000 W/m² irradiance. This photovoltaic panel size represents that largest that can fit on the reasonably sized casing 70.

The power cell 50 may further comprise a charge controller 55 (FIG. 1) to ensure that the Voltage and current supplied to the rechargeable battery is appropriate for recharging and does not overcharge or otherwise damage the battery.

Figure 5:
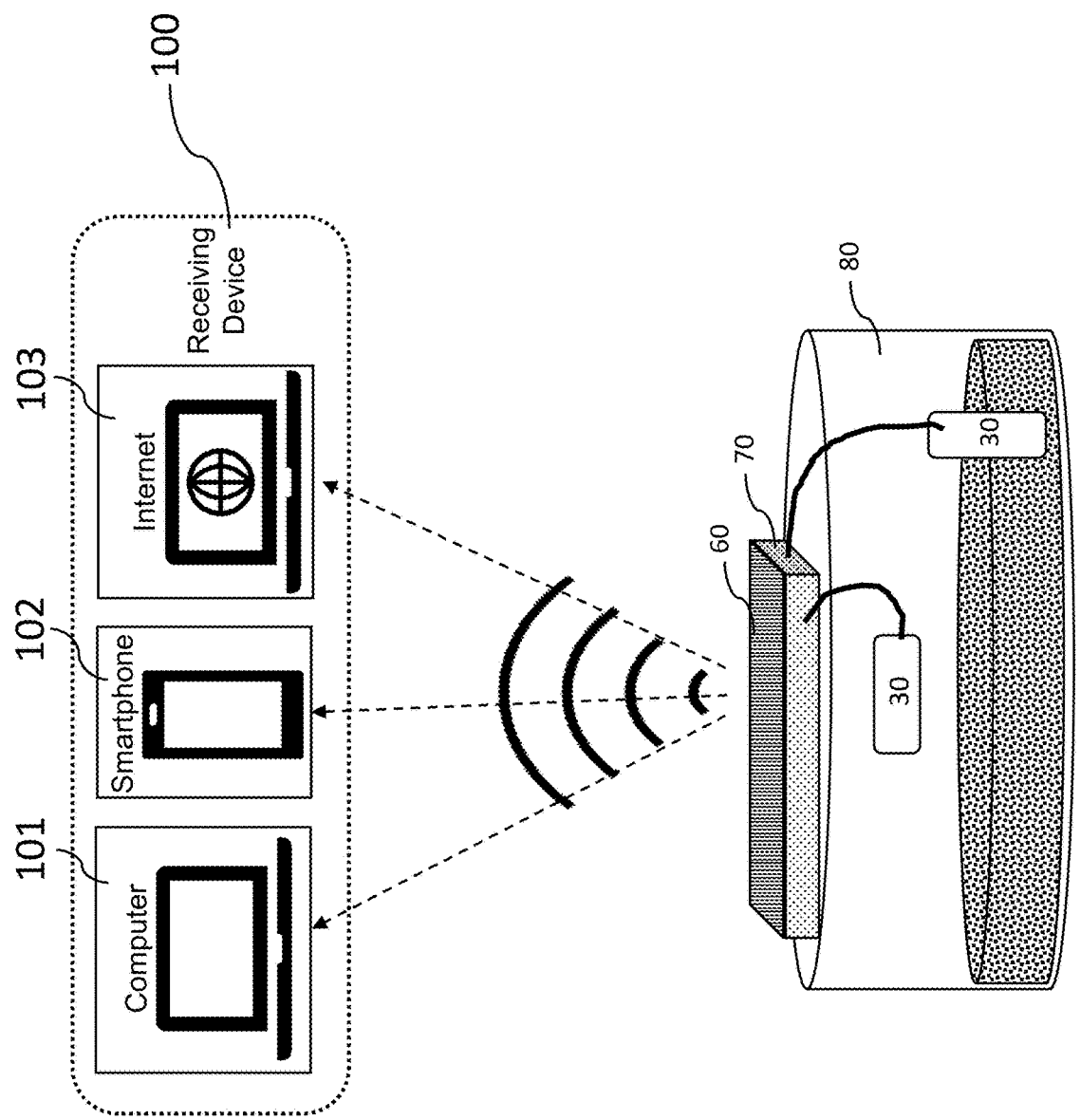
FIG. 5 depicts a schematic of the monitoring device communicating wirelessly with a receiving device where the receiving device is a computer, smart-phone or internet web site or cloud server.
Figure 6:
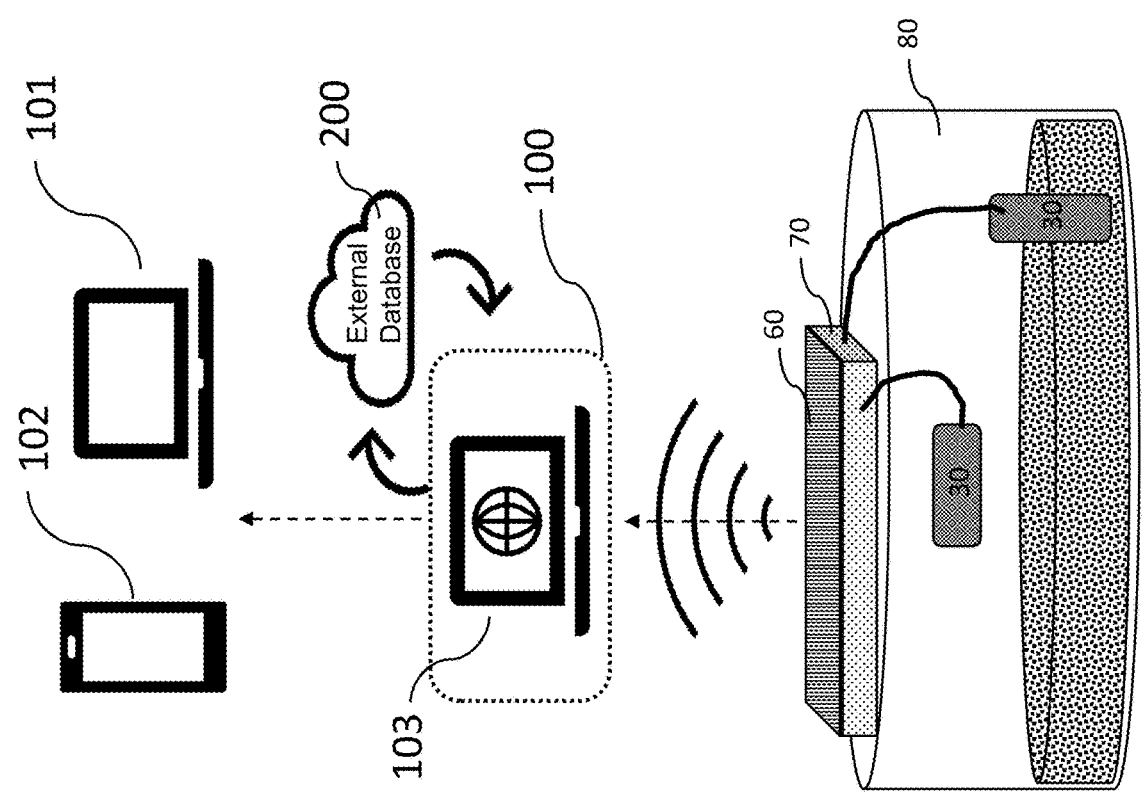
FIG. 6 depicts a schematic of the monitoring device communicating with a receiving device where the receiving device further communicates with an external data source such as a cloud server and where the receiving device further communications with an additional receiving device such as a computer or smart-phone.
Figure 7:
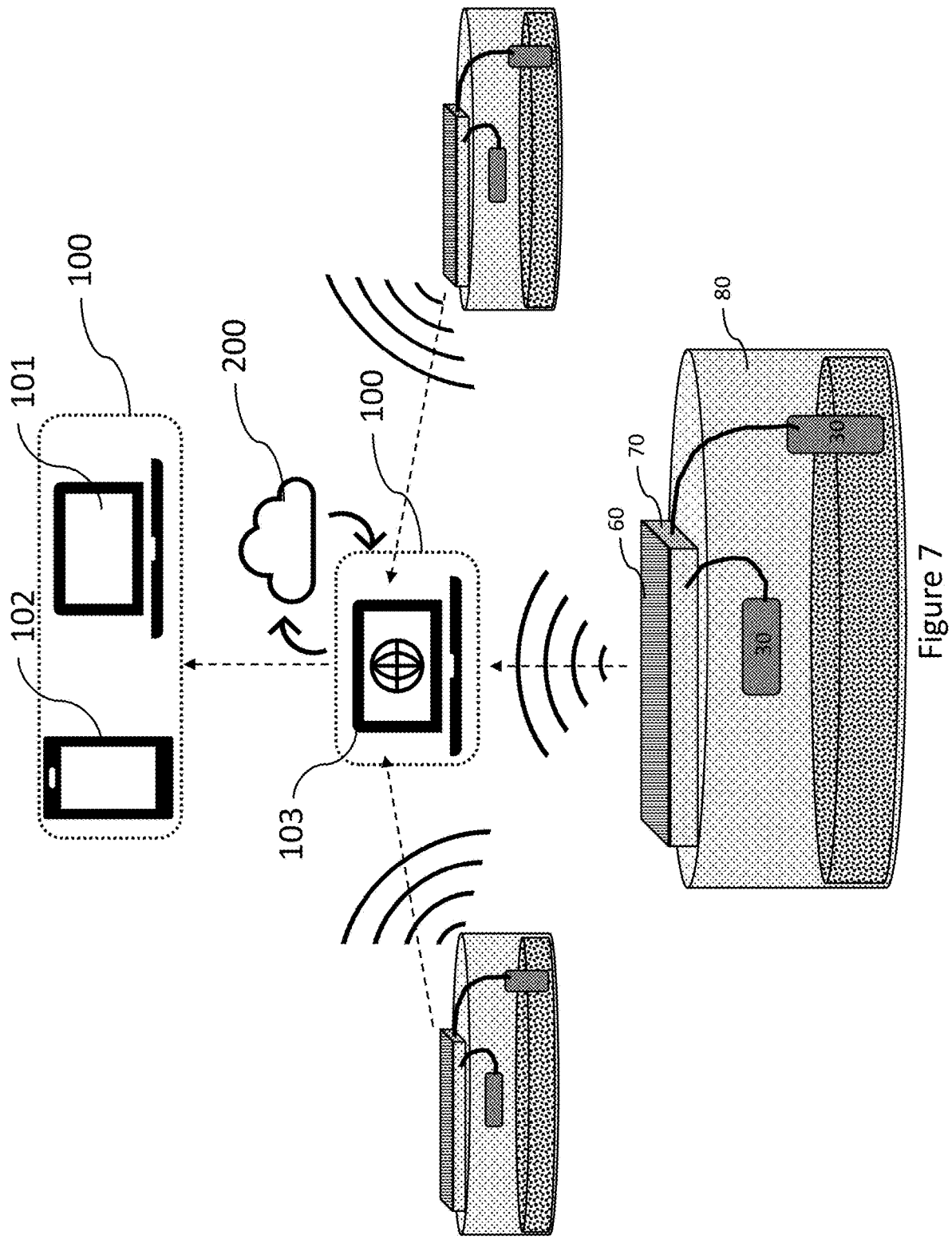
FIG. 7 depicts a schematic of the monitoring device communicating with a receiving device where the receiving device further communicates with an external data source such as other monitoring devices and where the receiving device further communications with an additional receiving device such as a computer or smart-phone.

Referring to FIGS. 5-7, the system controller 10 may further make periodic measurements of the power cell 50. These measurements most typically include measuring the Voltage. This Voltage data can optionally be used to calculate the state-of-charge of the power cell 50 by comparing the measured Voltage to published data for the type of electrochemical battery. The state of charge information may then optionally be reported the user via the communications controller 20, where is can then be communicated directly to a receiving device 100 such as the internet 103, computer 101 or smartphone 102, where data storage and further analysis can be performed. In case the state-of-charge is depleted, this may be further communicated to the user to provide guidance to reorient the device's solar panel for better exposure to sunlight or to remove debris from the solar panel to improve the available power resource for recharging.

As with the other components, data sampling from the power cell is managed within the low power consumption of the device. Sampling from the power cell may be done as many as 25 times per day, but to manage power consumption this sampling may be reduced to 10×/day or even 5×/day or only 2×/day. The power consumption associated with sampling the power cell should not exceed 0.1 W-hrs/day.

To accommodate the limits of the power cell and the recharging means, the monitoring device has a power consumption rate of less than 0.50 W-hrs/day, preferably less than 0.20 W-hrs/day. It has been found that conventional monitoring devices over-sample the data requirements of the natural composting process, which is a weeks-long or months-long process. This over-sampling has led to power requirements that exceed the capacity of small, low cost, self-powered monitors that would otherwise provide for convenient and efficient composting for home users. Specifically, by reducing the power consumption of the monitoring device, a small and low-cost device can be made without requiring connection to an external power source, such as line voltage. For example, the device may be in sleep mode more than 90% of a day or more than 95% of a day or even more than 99% of a day as a means to achieve. Similarly, the low power consumption of the monitoring device can be achieved by managing the data-sampling and communications frequency of the monitoring device.

As previously noted, the device may include two or more sensors. The system controller may sample data from the sensor(s) fewer than 25 times per day. The power consumption associated with sampling the sensors may be less than 0.20 W-hrs/day. The sensors may be one or more of a moisture sensor, humidity sensor, temperature sensor, pH sensor, methane sensor, carbon dioxide sensor, or oxygen sensor. Data from the two or more sensors may be sampled simultaneously.

The monitor comprises a casing. The purpose of the casing is to provide a weather-resistant housing for the components of the monitor and a means for mounting the monitor on (or nearby) a container for containing the composing material. The casing generally houses the system controller, communication controller, and power cell. The recharging means and sensors are generally outside of the casing and connected to the components inside the casing by electrical conduits such as wires penetrating the walls of the casing, with all penetrations suitably gasketed to minimize intrusion of water, dirt, or pests. The components outside of the casing such as the sensors and recharging means may connect to the monitor via one or more plugs or be hardwired.

The casing and necessary penetrations may be well gasketed to make it weatherproof and reduce the potential for intrusion of water, ice, dirt, or other contaminants into the casing.

The casing is preferably small, allowing it to be used in any of a number of home composting situations including small-volume composting (i.e. where the volume of the container is less than about 10 gallons). The casing may be any three-dimensional shape such as a cylinder or a parallelepiped.

The casing may be generally parallelepiped in shape with a maximum dimension of any given edge of the casing less than about 6". The casing may be generally parallelepiped with the area of the major face (meaning the face of the parallelepiped with largest surface area) less than about 20 square inches. The volume of the casing may be less than about 20 cubic inches or less than about 15 cubic inches or less than about 10 cubic inches.

In a preferred execution, the casing has a generally parallelepiped shape and the recharging means is a photovoltaic solar panel adjacent to the major face of the casing. This configuration has the benefit of increasing the reliability of the needed electrical connections between the solar photovoltaic panel and the controller, and in facilitating the mounting of the overall monitoring device to a compost bin or other stable surface.

In a preferred execution, the total void interior volume of the casing may be minimized to reduce total headspace that is above or around the needed electronic circuitry, power cell, and associated wiring and other connections. Minimizing headspace is preferred to limit the potential for liquid water to condense on in the interior of the casing due to the frequent hot/cold cycling of ambient temperatures. Condensation can cause short-circuits, corrosion, and other forms of premature failure of the electronic circuitry. In the event that the circuitry does not adequately fill the volume of the casing, interior void volume (also referred to as headspace) can be further reduced through the introduction of dunnage, preferably non-conductive dunnage.

In a preferred execution, the total headspace is less than 50% of the total case volume, preferably less than 30% of the volume of the casing. Optionally, a common desiccant, such as silica gel or bentonite clay, may be added to the headspace dunnage to further control interior moisture.

Method of Use

Figure 8:
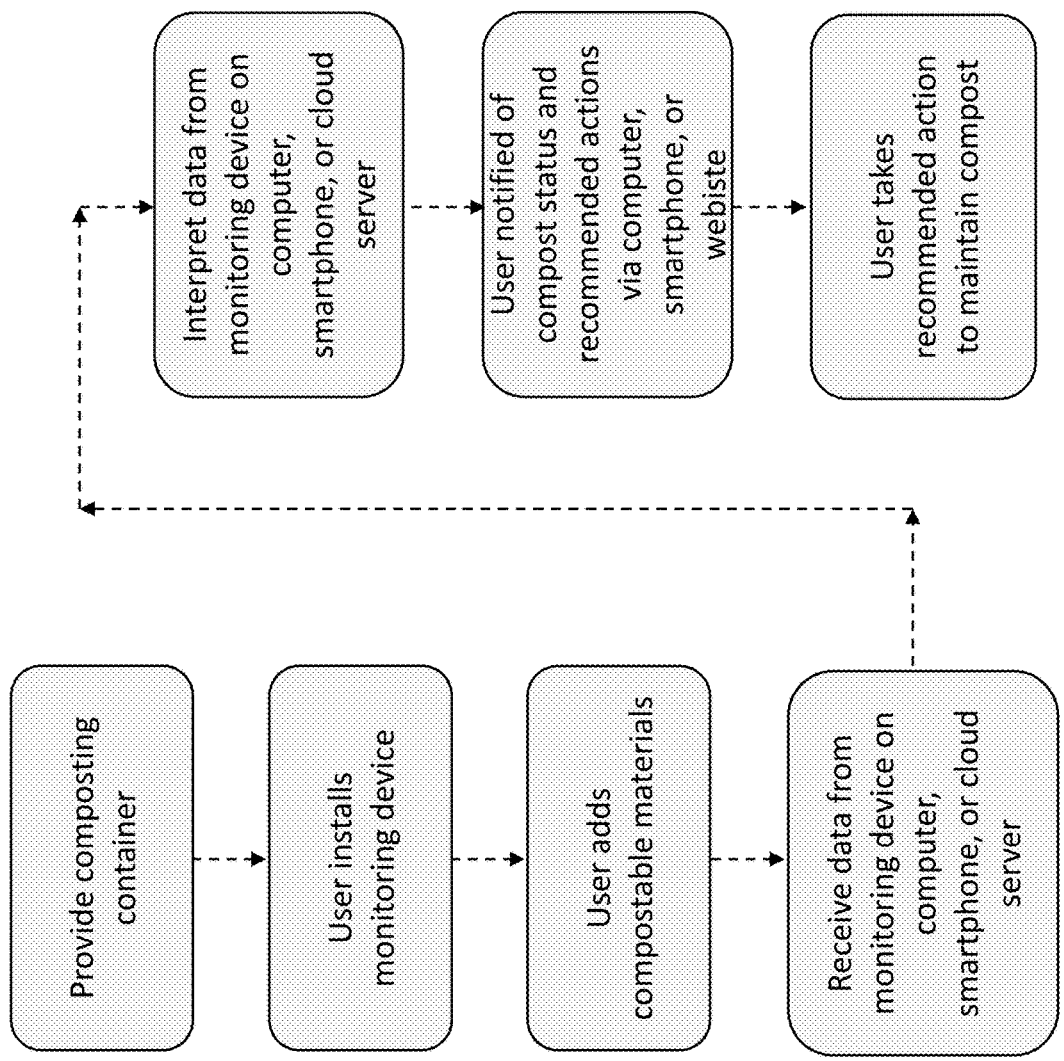
FIG. 8 depicts the method of use of the composting monitoring device

Referring to FIG. 8, the invention further includes a method of use of the monitoring device 1. As noted, devices for composting that monitor and act on the composting material are known. The devices are complex and expensive and generally require line-voltage. Reducing the electrical power consumption of the monitor 1 so that it can operate solely from the power provided by the recharging means 60 can be achieved by limiting the activity of the monitor 1, such as by removing non-essential activity from the monitor 1. While a digital readout of the sensor 30 data may be included in the monitor 1 (as noted above) the additional component of the digital readout would further consume power and is preferably omitted.

A preferred method of using the monitor includes only gathering and communicating the data from the sensors and doing so infrequently (as noted above). These data are communicated by the communications controller to a receiving device. Preferred communication means include wireless communications means such as Bluetooth, Wi-Fi, cellular LTE, 2G, 3G, 4G, 5G and the like. Preferred receiving devices include smartphones, computers laptops, tablets and the internet (i.e. via a modem to a cloud server or website). These preferred receiving devices can display the data from the sensors and can also have further componentry and capability for data storage and analysis which further allows historical sensor data to be displayed.

These preferred receiving devices, that have further componentry and capability for data storage and analysis, can also provide recommended actions to the user based on an analysis of the data and application of an algorithm. Recommended actions for composting may include stirring the composting material, aerating the compost material, adding more material to the composting material, adding carbon rich "brown" materials, adding nitrogen rich "green" materials, adding water, and combinations thereof. Recommended actions for the device management may include reorienting the device or cleaning the solar panel to improve charging performance of the rechargeable power cell. A preferred method of use includes providing such recommendations to the user via one or more user interfaces.

This analysis may include historical tracking of data regarding the user's compost conditions as well as climatic data and/or data from nearby users or users in other areas to allow for a more comprehensive understanding of composting conditions not just for the user but more generally in the user's area or among other users who identify as having similar composting habits/issues as the user.

In an exemplary embodiment, the receiving device has further componentry and capability for data storage and analysis (e.g. a smartphone, computer laptop, tablet, and the internet) and the receiving device gathers additional data other than the sensor data from other data sources (e.g. a "cloud") and incorporates that further data in the analysis when providing the user a recommended action. Such additional data may include current and historic climatic data such as temperature, humidity, altitude, hours of daylight, etc. in the geographic area surrounding the monitor. This data may also include the previous recommended actions and actions recorded by the user. In another exemplary embodiment, such additional data includes data from other users of similar monitors that allows the recommended actions to further be based on compost sensor data of nearby composting sensors.

1 Monitoring device
10 System controller
20 Communications controller
30 Sensor
40 Voltage regulator
50 Power cell
55 Charge controller
60 Recharging means
65 Analog multi-switch
70 Casing
80 Container
100 receiving device
101 computer
102 smartphone
103 internet
200 external database

What is claimed:

1. A monitoring device for use with composting comprising:
   a casing;
   a system controller;
   at least one sensor operatively connected to the system controller;
   a wireless communication controller;
   a power management controller;
   a power cell operatively connected to the system controller, power management controller, and the wireless communication controller;
   a recharging means operatively connected to the power cell;
   wherein the power consumption of the monitoring device is greater than 0 and less than 0.50 W-hrs/day;
   wherein the power cell is a rechargeable battery comprising of one of a Li-ion battery, a Ni-MH battery, a Ni-Cd battery, or a lead acid battery; and
   wherein the system controller measures the state of charge of the power cell greater than 0 and fewer than 6 times per day and the power consumption associated with measuring of the state of charge of the power cell is greater than 0 and less than 0.10 W-hrs/day.

2. The monitoring device of claim 1 comprising two or more sensors.

3. The monitoring device of claim 2 wherein the system controller samples data from all the sensors greater than 0 and fewer than 25 times per day.

4. The monitoring device of claim 2 wherein the power consumption associated with data sampling of the sensors is greater than 0 and less than 0.20 W-hrs/day.

5. The monitoring device of claim 1 wherein the at least one sensor is one of a moisture sensor, humidity sensor, temperature sensor, pH sensor, methane sensor, carbon dioxide sensor, or oxygen sensor.

6. The monitoring device of claim 1 wherein the communication controller is a WiFi controller or cellular radio controller.

7. The monitoring device of claim 6 wherein the communication controller includes sleep and wake cycles and wherein the controller wakes greater than 0 and less than 24 times per day.

8. The monitoring device of claim 1 wherein the rechargeable battery has maximum usable power capacity of 18.5 W-hrs.

9. The monitoring device of claim 1 wherein the recharging means is a photovoltaic solar panel.

10. The monitoring device of claim 9 wherein the surface area of the photovoltaic solar panel is greater than 0 and less than 20 square inches.

11. The monitoring device of claim 10 wherein the casing is a parallelepiped, and wherein the solar panel is adjacent to a major face of the casing.

12. The monitoring device of claim 1 wherein the volume of the casing is greater than 0 and less than 20 cubic inches.

13. The monitoring device of claim 12 wherein the interior headspace volume is greater than 0 and less than 30% of the volume of the casing.

* * * * *